May 1, 1962 J. E. HATFIELD 3,032,303
PARACHUTE PACK CONTAINER FASTENER AND RELEASE MECHANISMS
Filed April 11, 1958 2 Sheets-Sheet 1
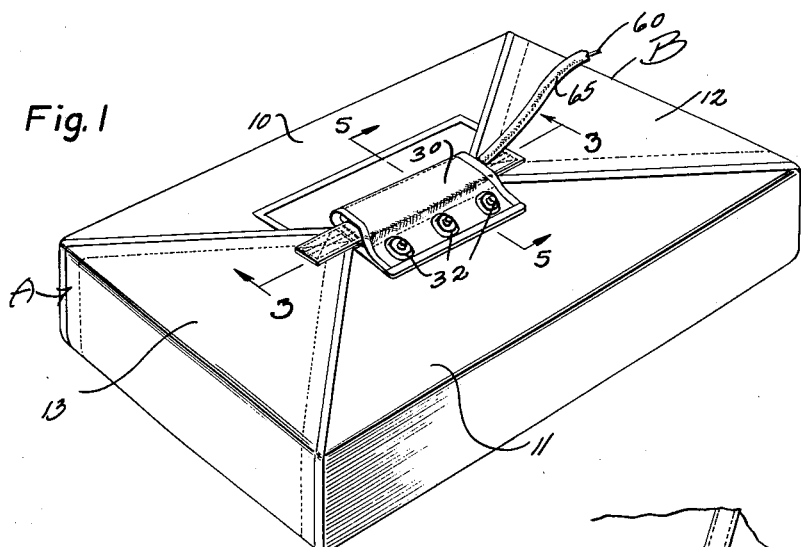
Fig. 1
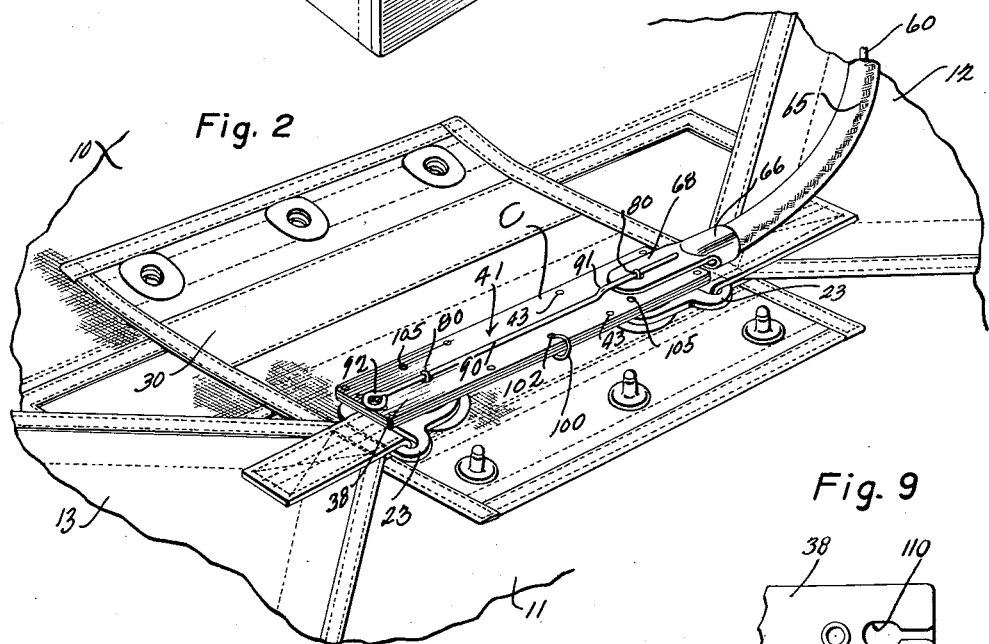
Fig. 2
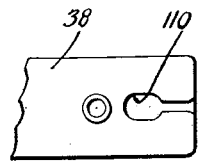
Fig. 9
Fig. 8
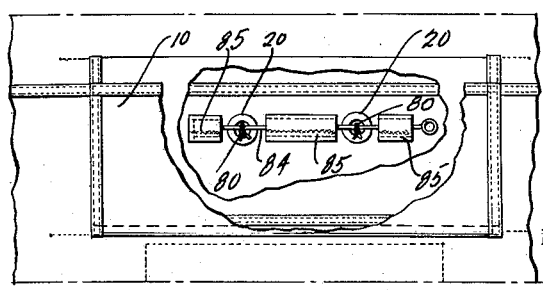
INVENTOR
John E. Hatfield
BY
ATTORNEYS

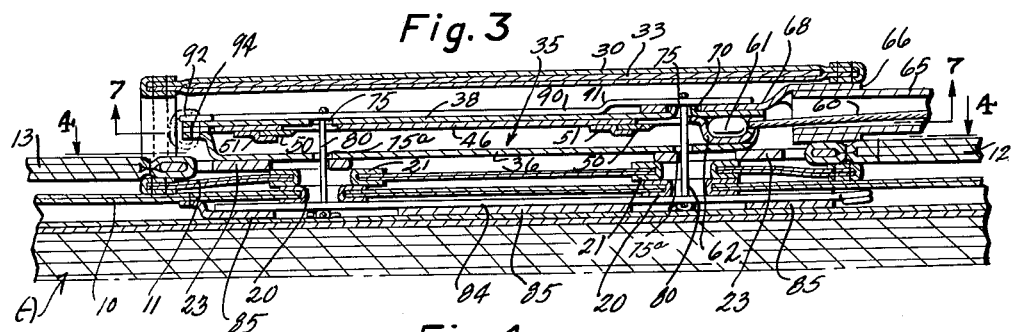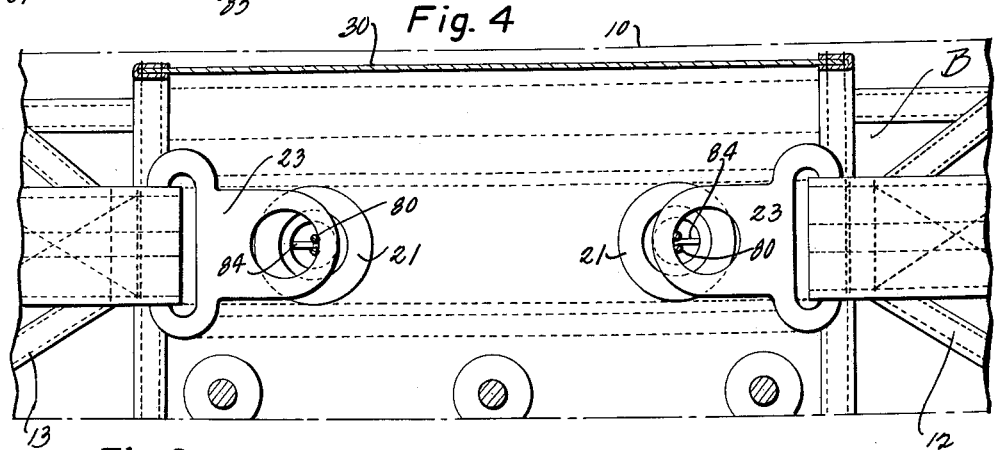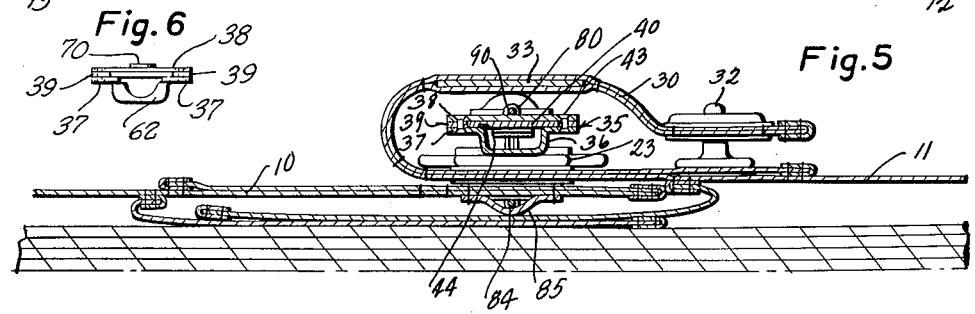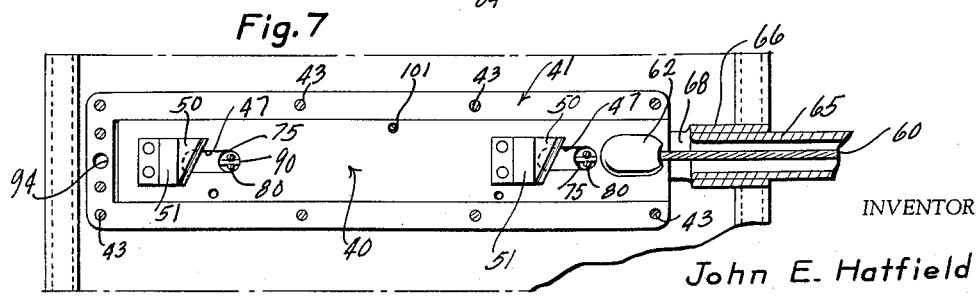

United States Patent Office 3,032,303
Patented May 1, 1962

3,032,303
PARACHUTE PACK CONTAINER FASTENER
AND RELEASE MECHANISMS
John Edward Hatfield, Stotfold, England, assignor to Irving Air Chute Co., Inc., Lexington, Ky., a corporation of New York
Filed Apr. 11, 1958, Ser. No. 727,962
Claims priority, application Great Britain Dec 17, 1957
6 Claims. (Cl. 244—149)

This invention relates to improvements in parachute pack opening and releasing means.

An object of this invention is the provision of an improved fastener means for releasably holding the flaps of conventional parachute pack containers in a closed condition, but of such nature that the same can be severed by a cutting operation for insuring safe opening of the pack.

Parachute packs for personnel wear are well known, and for the most part comprise a container of flexible material, having flexible flaps with rubber bands or other means for throwing the flaps open upon release of a fastener mechanism, whereby to permit ejection of the parachute canopy and shroud lines. Among such types of packs are those shown in United States Patents 1,403,983 and 2,542,925. For many years it has been customary to use grommets or eyelets on one of the flaps, and cones adapted to fit in said grommets located on another and opposite flap, with rip cord means to hold the cones in the grommets for releasably closing the pack container. Various designs of packs are in use, some of them have end flaps provided with apertured lugs to also receive the fastener cones. In modern times it is necessary for an aviator to carry and have associated with him various accessories such as an oxygen tank, supply equipment, inflatable rafts, pressure suits, safety harness, ejectable chair equipment, etc. It has become necessary to reduce the size and weight of parachute packs to a minimum. This has necessitated compacting the canopies and shroud lines in the parachute pack to such an extent that the load on the fastening means, including the cones and rings is such as to create failure hazards, such as to prevent proper withdrawal of the cones from the grommets and lugs of the container flaps. It is therefore a primary object of this invention to provide an improved rip cord actuated fastener construction for holding the flaps of parachute pack containers in closed condition, and which fastener construction includes means for efficiently and compactly holding the flaps closed, such as cords and easily severable wires, etc., and rip cord actuated cutter means to sever the cords or wires in order to permit the flaps to open efficiently for release of the pack contents.

A further object of this invention is the provision of an improved fastener means for the flaps of parachute pack containers embodying cutter means which is rip cord actuated for severing the holding members, usually cords or wires.

A further object of this invention is the provision of improved safety means associated with a cutter type of parachute pack fastener and release mechanism for efficiently maintaining the fastener parts in such relation that the cutter will be instantly ready for actuation by the rip cord to permit quick and efficient release of the flaps of a parachute pack container.

Other objects and advantages of this invention will be apparent during the course of the following detailed description.

In the accompanying drawings, forming a part of this specification, and wherein similar reference characters designate corresponding parts throughout the several views:

FIGURE 1 is a perspective view of a parachute pack in closed condition and having the improved fastener means associated therewith.

FIGURE 2 is a fragmentary perspective view of the fastener mechanism showing the associated flaps of the container, with the guard flap in opened position to expose the fastener assembly.

FIGURE 3 is an enlarged fragmentary longitudinal sectional view taken through the fastener means showing the associated parts which hold the flaps of the container in closed position, the view being taken substantially along the line 3—3 of FIGURE 1.

FIGURE 4 is a cross sectional view taken through the fastener mechanism substantially on the line 4—4 of FIGURE 3.

FIGURE 5 is a transverse cross sectional view taken through the fastener mechanism of the pack, substantially on the line 5—5 of FIGURE 1.

FIGURE 6 is an end view of a housing for the cutter blade of the fastener assemblage showing the cutter exit end of such housing.

FIGURE 7 is a cross sectional view taken through the fastener details substantially on the line 7—7 of FIGURE 3.

FIGURE 8 is a fragmentary view of a portion of the fastener means and the arrangement of flaps with the fastener means assembled to hold the flaps in closed position, and more particularly showing one of the fastener cord supporting members and the means for mounting it upon a container flap.

FIGURE 9 is a fragmentary plan view of a modified form of cutter means receiving housing.

In the drawings, wherein is shown a preferred embodiment of the invention with certain modifications, the letter A may generally designate a rather conventional type of parachute pack including a container B and the improved fastener means C associated therewith for holding the flaps of the container closed.

The parachute pack container B is the usual rectangular type, and includes side flaps 10 and 11 and end flaps 12 and 13. The flaps may be of the same size in the event the container is square. In usual practice, one of the side flaps, is provided with cones which are transversely apertured and which are adapted to releasably fit through grommets and apertured lugs provided in the other flaps. A rip cord, well known in the art, is used to fit in the transverse apertures of the cones to hold the flaps ready. It is also conventional in parachute pack construction to provide rubber bands or other spring means to insure the unfurling of the flaps in order to release the contents of the container when the pack is opened.

The container B of this invention is modified to the extent that side flaps 10 and 11 are each provided with grommets or eyelets. Thus, the flap 10, as shown in FIGURE 3, is provided with a pair of eyelets or grommets 20 therein and the opposite flap 11 is provided with a pair of eyelets or grommets 21 therein. The end flaps 12 and 13 are provided with transversely apertured lugs or fastener parts 23. All of the apertures of the grommets 20 and 21 and the lugs 23 are adapted to register for receiving the cords or wires of the fastener means C in order to hold the flaps closed, as will be subsequently described in detail. Flap 11 may additionally be provided with a guard flap 30 which is adapted to fold over in protecting relation upon the fastener means C, as is shown in FIGURE 1. It is provided with releasable snap fasteners 32 to hold the said flap 30 in such guarding position. A feature of the guard flap 30 is that it has a rigid elongated rectangular shaped bar 33 sewn therein, shown in FIGURES 3 and 5 of the drawings, for protecting and preventing injury to the parts of the fastener mechanism C.

The fastener means C principally comprises a slidable cutter bar 40 disposed within a housing 41. This housing 41 includes a lower housing portion 35, best shown in cross section in FIGURE 5, consisting of a U-shaped elongated channel portion 36 having side or lateral flanges 37. Furthermore, the housing 41 includes a top plate 38 which is riveted to the flanges 37, and spaced therefrom by spacer members 39; the rivets being shown at 43. Thus, the housing 41, between the plate 38 and the flanges 37, provides inwardly facing trackway grooves 44 adapted to receive the side margins of the slidable cutter bar 40 for linear travel of the bar 40 along the housing. The housing plate 38 is provided with openings 75 and the bottom channel 36 is provided with similar aligning openings 75ª (see FIGURE 3); said openings 75 and 75ª being adapted for alignment with the grommets and eyelets to receive the fastening cords or wires therethrough.

The cutter bar 40 includes a bar body 46 provided with elongated slots 47 therein adapted to register with the openings in the grommets and lugs of the parachute container flaps and adapted to receive therethrough the fastener cords or wires employed in holding the flaps closed. Furthermore, the bar 46 is provided in the undersurface thereof with a pair of cutter blades 50 secured in any approved manner such as by clips 51 riveted to the bar; said blades 50 having sharpened edges which are located across the slots 47 at an acute shearing angle with respect to the line of travel of the cutter bar, in order that the blade edges may sever the fastener cords, wires or other fastener means provided for holding the flaps together.

A rip cord 60, preferably flexible, is employed, having a capsule shaped lug or nipple 61 on the end thereof; the latter being adapted to be releasably disposed in a socket portion 62 provided in the extreme end of the bar plate 46. The socket 62 opens upwardly to permit release of the nipple 61 from said socket when the cutter bar is withdrawn from housing 41, upon a release actuation of the rip cord mechanism.

It will be noted that nipple 61 is held in position in the socket 62 by plate 38 so long as the cutter bar 40 is disposed within its housing 41, in the assemblage shown in FIGURE 3.

The usual flexible guard tube 65 for the rip cord 60 may be employed, having a ring-shaped body 66 mounted or otherwise secured at the end thereof and said body having an axially extending lug 68, best shown in FIGURE 2, provided with a transverse opening therein adapted to releasably socket upon a ring-shaped boss 70 fixed on the top plate 38 of the cutter bar housing surrounding an opening 75, as shown in FIGURE 3. This connection of the lug 68 is releasable, but it normally holds the cord housing 65 in proper position to the fastener mechanism until the release cutting of the fastener members has been effected.

Two severable fastener cords or wires 80 are employed for extension through the various registering apertures or openings in the grommets and lugs of the parachute container flaps and through the openings 47, 75 and 75ª above described. These fastener members 80 may be made of nylon or some other quite easily severable wire material and preferably are looped and tied in place. The means for holding them in place through said openings comprises an inner removable pin 84 which is held in position upon the flap 10 by means of flexible sleeve portions 85; the latter holding the pin for positioning across the openings in the grommets or eyelets 20 of the flap 10, as shown in FIGURES 3 and 8 of the drawings. Another releasable pin or retaining member 90 is provided, to overlie the top plate 38 of the housing 41; this pin 90 being adapted to receive the looped bight portions of the fastener loops 80 which extend through the openings 75 in the top plate of the housing 41, in the position shown in FIGURE 2. The pin 90 is offset at 91 in order that it can overlie the extension 68 of the rip cord guard housing end (see FIGURE 3).

The two retaining pins 84 and 90 have ring-shaped service handles and in the case of the pin 90, this loop indicated at 92, may overlie and align with suitable openings 94 provided through the end of the housing 41, to receive a safety cord or wire in order to prevent accidental release thereof (see dotted line position in FIGURE 3).

In the assemblage of the fastener C upon the parachute pack, the parts are arranged as above described, with the nipple or lug 61 disposed in the socket 62 and the rip cord housing extension 68 extending over the boss 70 with the pins 84 and 90 arranged at opposite sides of the housing across the fastener loop receiving openings. The fastener cords or wires or loop members 80 are threaded through the grommet and lug openings of the parachute container flaps and through the housing openings 75 and 75ª, and the bight ends thereof are extended over the pins 84 and 90, as shown in FIGURE 3 of the drawings. The wires or loops are twisted or tied into secured taut position, and this secures the fastener mechanism upon the flaps in the relation shown in FIGURE 3.

As a safety expedient, to prevent accidental lengthwise movement of the cutter bar 40 within its housing 41, it is proposed to use an easily severable cord or wire 100 (see FIGURE 2); the same being merely a safety type of device, which is threaded through the openings 101 of the cutter bar, shown in FIGURE 7, and through openings 102, likewise provided at the outer marginal portions of the housing 41. This safety cord 100 may be severed just prior to donning of the pack or when it is to be used upon a wearer, or it may be made sufficiently light and easily severable by shearing when the cutter bar is pulled by the rip cord.

Other openings 105 may be provided at the extreme side marginal edges of the housing 41, which do not pass through the cutter bar, for receiving safety cords (not shown) for position attaching of the housing upon the flap 11.

When it is desired to operate the fastener mechanism through a pull upon the rip cord, the individual wearing the pack either manually pulls the rip cord or it is actuated through barometric release mechanism such as set forth in U.S. Patent 2,676,655. Exerting a pull upon the rip cord 60 will cause the cutter bar 40 to move endwise, in the direction of the pull-out of the housing 41, since the end of the housing 41 is shaped with an exit opening, as shown in FIGURE 6, to permit removal of the socket 62 endwise from the housing 41. The angled knife edges of the cutters 50 will sever the loops or fastener members 80. Instantly, the elastics or resilient means which normally unfurls the flaps of the parachute container will open the pack and release the parachute contents of the container. The entire cutter assembly 40 is detachable from the pack after severing of the fastener cords, and the terminal portion of the rip cord housing is freed from engagement with boss 70. The nipple or capsule 61 also moves out of its socket 62.

As shown in FIGURE 9, it may be desired to provide the housing plate 38 with a keyhole slot type of opening 110, to enable the rip cord and its nipple 61 to be inserted into the housing and nipple socket when the cutter is in partial retracted position in the housing. The cutter bar can then be moved inwardly slightly beyond the slot 110 to prevent accidental dis-connection of the parts.

Various changes in the size, shape and arrangement of parts may be made to the form of invention herein shown and described, without departing from the spirit of the invention or scope of the claims.

I claim:

1. In a release mechanism for parachute pack containers, the combination of an elongated housing having a pair of relatively spaced non-aligning transverse openings therethrough, a cutter bar slidable in the housing and extensible at an end therefrom and having cutter blades mounted thereon adapted to move across the openings, a rip cord detachably connected with the cutter bar when the latter is retracted in the housing and releasable from the cutter bar when the latter is extended from the housing, relatively independent severable fastener members extensible through the openings of the housing in position to be severed by the cutter bar when the latter is extended from the housing, and means at opposite sides of the housing, above and below the openings therein attaching the ends of said fastener members to hold said members in position in the line of action of the respective cutter blades.

2. In combination with a parachute pack including a container having closure flaps provided with grommets therein arranged so that when the container is closed the openings in the grommets will align with one of said flaps overlying another flap, a rigid supporting frame carried by one of said flaps having an opening therein adapted to align with the openings of the grommets of the flaps when the flaps are in closed position, a rigid cutter member movably carried by said frame, a severable fastener member extended through the aligning openings of the grommets of said flaps and frame and in position to be severed upon movement of said cutter member, said fastener member consisting of looped ends one extended directly beneath the bottom side of under flap and the loop at the opposite end extended above the frame, and releasable pins threaded through the fastener member loops.

3. In combination with a parachute pack including a container having a packed parachute therein, the container comprising a body portion upon which the parachute is packed and a plurality of closure flaps connected to the body portion and adapted to overlie the packed parachute and including contacting outer and inner flaps, said flaps being provided with fastener receiving openings therethrough adapted to register when the container is closed, a severable fastening means extending through said openings having means directly at the innermost side of the inner flap and means at the outermost side of the outer flap to hold the fastener means in taut position for maintaining the flaps in packed closing position above the packed parachute, cutter means movably connected upon one of the flaps and so associated and arranged with respect to said severable fastening means as to enable severing of the fastener means upon movement of said cutter means, and a rip cord connected with said cutter means to move the same upon its flap for severing of said fastener means.

4. In combination with a parachute container having closure flaps provided with openings whereby the flaps when in closed position will have said openings aligned, a rigid housing mounted upon one of the container flaps and provided with a transverse opening therein adapted to registered with the openings of the closure flaps when the container is closed, a slidable rigid cutter member mounted in said housing for movement therein, said cutter member itself having an aperture therein adapted to align with the aforesaid openings of the closure flaps and housing when they are in registration, said slidable cutter member having a cutter blade with a knife edge lying across the aperture of the cutter member and movable with the cutter member in a path across the aligned openings of the closure flaps when the container is closed, a severable fastener member threaded through said openings of the housing, flaps and through the aperture of the cutter member, means for holding the said cutter member upon the housing in such position that upon movement of the cutter member along the housing said fastener means will be severed to release said flaps, and a rip cord connected to said cutter member for so moving it as to sever the fastener member.

5. In combination with a parachute pack having a container provided with a body and closure flaps; said closure flaps being provided with a first pair of aligning eyelets and a second pair of aligning eyelets, the two pairs of eyelets being non-aligning when in assembled relation with the parachute container closed, an elongated rigid housing mounted upon one of said flaps having transverse non-aligning openings therein for registration one with each of said pairs of aligning eyelets when the container is closed, an elongated cutter bar slidably mounted in said housing having non-aligning transverse openings therein adapted to respectively align one with each of the pairs of openings of the aligning eyelets and transverse opening of the housing when the container is closed, blades carried by the cutter bar having knife edges extending over the cutter bar openings, a rip cord having means connected with the cutter bar for pulling of the same in order to move the blades across the aligning openings of the flaps and housing, retaining members, one being located and secured at the top of the housing and the other being secured at the bottom side of the flap upon which the housing is mounted, and fastener cords extending through the aligned openings of the eyelets, housing and cutter bar having ends looped over and secured to said retaining members to hold said fastener cords in position to close the flaps of the container.

6. In a release mechanism for holding the flaps of parachute pack containers closed, the combination or a rigid housing having a chamber therein and having spaced top and bottom walls provided with pairs of aligning openings therein, a rigid cutter bar slidable in the chamber of the housing having openings therein adapted to respectively align with the pairs of openings of the housing, a rip cord having a releasable connection with said cutter bar, blade means mounted on the cutter bar having knife edges overlying and facing each of the openings of the cutter bar, severable flap fasteners extending through each of the pairs of aligning openings of the housing and through the openings of the cutter bar aligning therewith, and releasable retaining means having the ends of the fasteners attached therewith for hold them in taut position within said aligned openings.

References Cited in the file of this patent
UNITED STATES PATENTS

| 2,711,869 | Carroll | June 28, 1955 |

FOREIGN PATENTS

| 629,647 | France | Aug. 1, 1927 |
| 35,119 | France | June 18, 1929 |